United States Patent [19]

Natta et al.

[11] Patent Number: 5,735,225
[45] Date of Patent: Apr. 7, 1998

[54] METHOD FOR RECOVERING ENERGY FROM SOLID WASTE

[75] Inventors: Giuseppe Natta, Giussago; Enrico Calcaterra, Codogno; Marco Tugnoli, Corteolona, all of Italy

[73] Assignee: Fertilvita S.r.l., Corteolona (Pavia), Italy

[21] Appl. No.: 537,455

[22] Filed: Oct. 2, 1995

[30] Foreign Application Priority Data

Oct. 4, 1994 [IT] Italy .................... MI 94A002013

[51] Int. Cl.⁶ .......................................... F23G 7/00
[52] U.S. Cl. ..................... 110/346; 110/224; 110/222; 110/248; 435/290.1
[58] Field of Search ....................... 110/302, 346, 110/348, 224, 229, 236, 248; 435/290.1

[56] References Cited

U.S. PATENT DOCUMENTS

| 3,702,596 | 11/1972 | Winther .................................. 110/224 |
| 4,203,376 | 5/1980 | Hood . |
| 4,376,373 | 3/1983 | Weber et al. . |
| 5,206,173 | 4/1993 | Finn . |
| 5,587,320 | 12/1996 | Shindo et al. ........................ 435/290.1 |

FOREIGN PATENT DOCUMENTS

| 487052 | 5/1992 | European Pat. Off. . |
| 1337127 | 9/1987 | U.S.S.R. . |
| 974047 | 11/1964 | United Kingdom . |

*Primary Examiner*—Henry A. Bennett
*Assistant Examiner*—Susanne C. Tinker
*Attorney, Agent, or Firm*—R. Neil Sudol; Henry D. Coleman

[57] ABSTRACT

A method for recovering energy from waste, which includes: a first waste trituration step; fermentation of the waste in the presence of air. The method allows to recover the energy produced by waste combustion with an efficiency that is at least 50% higher than methods used so far.

7 Claims, No Drawings

METHOD FOR RECOVERING ENERGY FROM SOLID WASTE

BACKGROUND OF THE INVENTION

1. Field of the Invention

The present invention relates to a method for recovering energy from solid waste.

2. Description of the Prior Art

Waste is currently collected and transferred to energy-recovering incineration plants or is pre-processed to produce RDF.

In the case of collection over extensive areas, there are transfer stations where the waste is collected and compacted in order to reduce transport costs.

RDF production plants entail the trituration of waste and the separation of the putrescible components from the combustible ones and from the inorganic-based ones such as metals and glass.

Separation is very complicated, and the separated combustible portion, still contaminated by foul-smelling putrescible substances, generally does not exceed 30%.

In RDF Systems, the putrescible portion is partially oxidized into compost, which finds no useful application and is generally eliminated in landfills.

Inorganic materials recovered in these plants are also generally foul-smelling and difficult to reuse.

Incineration systems, on the other hand, have very low energy efficiency, since the waste is constituted by non-uniform batches of coarse-graded material with a variable calorific value.

Accordingly, combustion occurs in grate systems or, with greater difficulty, in fluidized-bed systems, in which energy efficiency is very low.

Furthermore, in the combustion area there are significant amounts of waste that take a long time to burn completely also causing adjustment and shutdown of the system to be long and complicated operations, in case of emergency.

SUMMARY OF THE INVENTION

The aim of the present invention is to provide an energy recovery method that allows to recover the energy produced by waste combustion, with an efficiency that is at least 50% higher than that of the prior methods, by maximally exploiting the exothermic reaction in order to dry the refuse in the shortest possible time. A portion of the organic substance acts as combustible in the process, while the rest, which is highly dehydrated, favors the increase of PCI. It is not desirable to finalize the aerobic process to the production of compost from RSU because of the poor agronomic and environmental qualities of such material.

Another object of the present invention is to provide a method in which it is not necessary to separate the waste into its various components.

Another object of the invention is to enormously reduce environmental impact with respect to conventional systems.

Another important object is to provide a method that has a significantly higher energy efficiency than conventional systems.

This aim, these objects and others which will become apparent hereinafter are achieved by a method as claimed in the appended claims.

Further characteristics and advantages will become apparent from the description of a preferred but not exclusive embodiment of the invention.

DESCRIPTION OF THE PREFERRED EMBODIMENTS OF THE INVENTION

The first stage of the method consists of a coarse trituration of the waste (without separating it into its components); the second stage of the method (the biological one) consists of a subsequent fermentation of the triturated waste in the presence of air.

The rigid components of the waste allow to obtain a mass that is permeable to air and through which the air can be made to flow, forming a pressure differential, even in thick layers (up to approximately 18 meters in thickness).

In order to perform this operation without an environmental impact, fermentation is performed in enclosed spaces and the air, after passing through the layer of waste, is sent to a biofilter, which is generally provided on the upper part of the enclosed space.

Fermentation starts spontaneously after mixing the material in the waste triturator, and produces an increase in the temperature of the mass up to approximately 65°–70° C.; fermentation then continues until the more putrescible fraction (the combustiblee in the process) has burned completely, with simultaneous evaporation of most of the water contained in the waste.

The water content passes from approximately 35–50% to 15–20%, with a consequent increase in the net calorific value.

The fermentation time ranges from 15 to 25 days according to the relative humidity of the air that is injected and/or aspirated, and according to the moisture content of the waste. If cold water or another water dehydration system is available and ambient humidity and temperature are high, it can be convenient to dry the air before blowing it into the layer of waste, in order to decrease the fermentation time.

The waste can be fed to the triturator, sent into the fermentation bed, and extracted from it in a simplified and automatic manner by means of robotized traveling cranes.

The waste, after this biological combustion stage, is perfectly odorless, has a good water repellency index, can be easily compacted, and has undergone a weight loss of approximately 25–35%.

If the fermented waste originates from a collection in which glass is collected separately, after extracting the metals by means of a magnet, the waste presumably has an ash content of no more than 20%, a moisture content of approximately 15–20%, and a net calorific value that is higher than 3000 kcal/kg and can therefore be classified as RDF.

If separate glass collection is not provided, the amount of ash can be higher, and it is therefore necessary to add similar waste having a low ash content, in addition to the municipal solid waste. Otherwise, it is necessary to refine the material by a series of operations:

screening elimination of iron and metals pneumatically removing light and fine material, by removing the light organic dust that is added to the mass of waste, by means of air currents in the screening output.

The main characteristic of this material, in addition to the high net heat value, is that it can be easily and cheaply triturated into pieces that have an average diameter of less than one centimeter.

The final material is therefore a triturable material whose combustion can occur in an air-injected flame, like the combustion of coal fines.

Furthermore, the final material is perfectly odorless and easy to compact both in bales and in compactors, and can therefore be easily transported even to remote burning facilities.

The compacted material can be stored easily, after waterproofing it with a polyethylene film, without environmental impact, since it is odorless, even in landfills from which it can be recovered to be sent to burning.

Combustion in an air-injected flame can occur both in industrial plants such as cement factories and in specific plants.

This kind of combustion allows very high energy efficiency in very simple plants, which can also be very distant from the sites where the material is produced.

The following example allows to better understand the advantages of the method according to the invention.

EXAMPLE

Waste originating from municipal collection was shredded in a rotary triturator with a capacity of 150 cu m/h. The material that was obtained had an average diameter of 5 to 50 cm. Energy usage was 3–3.5 kW/ton.

The material thus obtained was accumulated on a porous bed that was 6 m high and into which air was aspirated with a linear flow rate on the order of 0.5 cm/sec.

The aspirated air was sent to a biofilter, which consisted of a layer of peat mixed with wood bark that was approximately 80 cm high and in which the air was made to flow at a rate of approximately 5 cm/sec.

No odor was detected in the upper part of the biofilter, since the odor-producing components of the emissions were degraded.

After 18 days, moisture reached 17%; iron materials were eliminated from the waste which was also screened to eliminate the fine inorganic fraction, which was predominantly constituted by glass.

The bacterial load, expressed as total coliforms, dropped from $10^8$ to $10^3$ ufc/ml.

The waste thus treated was odorless and was subsequently compacted in bales weighing 1.5 tons each.

Part of the compacted material was covered with a polyethylene film and was placed in a landfill on a waterproof sheet; part was placed in a landfill with no covering, and part was sent to fine grinding.

The rainwater that fell over 10 months on approximately 400 tons of covered compacted material was collected on a waterproof sheet and then analyzed; it was found to be within the specifications of Table A of Italian law no. 915/82 and fit for discharge.

The BOD of the water collected over 10 months below the compacted, non-covered material was approximately 1/10th of that of municipal solid waste landfills.

In both cases, the compacted material underwent no further significant fermentation during the storage period and maintained its original characteristics.

The compacted material meant for fine trituration was triturated with a modified blade grinder to an average diameter of 1 cm. Energy consumption was 12 kW/ton.

The fines thus obtained were transported with an amount of air equal to 600 cu m/ton and fed into a combustion chamber with a diameter of 30 cm and a length of 3 m, preheated to 900° C. in the presence of a methane pilot flame.

Combustion occurred completely, and the ash had an organic substance content of less than 12 ppm.

In practice, it has been observed that the invention achieves the intended aim and objects, providing a method that is capable of recovering the energy contained in solid waste with an efficiency that is 50% higher than conventional systems for producing RDF.

An advantage of the method according to the invention is the highly efficient combustion of the waste by virtue of its low moisture content. Another advantage of the method according to the invention is that it is possible to closely control the combustion plant, allowing easy adjustment and shutdown of the plant if required. The method according to the invention is susceptible of numerous modifications and variations, all of which are within the scope of the inventive concept; all the details may be replaced with technically equivalent elements. The materials employed, as well as the dimensions, may of course be any according to the requirements and the state of the art.

We claim:

1. Method for recovering energy from waste, comprising:
   a) triturating waste material coarsely;
   b) accumulating the triturated waste material in an enclosed space in layers which are less than approximately 18 meters thick;
   c) fermenting and drying the waste material in the presence of air which is made to flow through said layers;
   d) feeding said air from the waste material to a biofilter;
   e) refining said waste material by screening, eliminating iron and other metals, and pneumatically removing light and fine material;
   f) triturating said fine material into pieces having an average diameter of less than one cm; and
   g) storing and burning the triturated fine material.

2. The method according to claim 1 wherein the fermenting of said waste material is followed by compacting said waste material in bales.

3. The method according to claim 1 wherein said air is dried and subsequently injected into said layers.

4. The method according to claim 1 wherein the triturated waste material is accumulated on a porous bed prior to the fermenting and drying of said waste material.

5. The method according to claim 1 wherein said biofilter includes a layer of peat mixed with wood bark.

6. The method according to claim 1 wherein the screening of said waste material includes the eliminating of a fine inorganic portion of said waste material, the eliminating of iron and the fine inorganic portion following the fermenting of said waste material.

7. Method for recovering energy from waste, comprising:
   a) triturating waste material coarsely;
   b) accumulating the triturated waste material in an enclosed space in layers which are approximately 7 meters thick;
   c) fermenting and drying the waste material in the presence of air which is made to flow through said layers;
   d) feeding said air from the waste material to a biofilter;
   e) refining said waste material by screening, eliminating iron and other metals, and pneumatically removing light and fine material;
   f) triturating said fine material into pieces having an average diameter of less than one cm; and
   g) storing and burning the triturated fine material.

* * * * *